United States Patent [19]

Chu

[11] Patent Number: 4,877,840

[45] Date of Patent: Oct. 31, 1989

[54] POLYOLEFIN CONCENTRATE

[75] Inventor: Kenneth C. Chu, Kingston, Canada

[73] Assignee: Du Pont Canada Inc., Mississauga, Canada

[21] Appl. No.: 144,232

[22] Filed: Jan. 15, 1988

[30] Foreign Application Priority Data

Jan. 28, 1987 [GB] United Kingdom ............. 87/001914

[51] Int. Cl.$^4$ ..................... B29C 35/02; B29C 47/00; B29C 67/02; C08L 23/04
[52] U.S. Cl. ..................................... 525/240; 264/68; 264/117; 264/118; 264/122; 264/141; 264/148; 264/211; 264/211.23; 264/349; 425/379.1
[58] Field of Search ................. 264/68, 117, 118, 122, 264/141, 148, 210.6, 211, 211.23, 349; 425/379.1; 525/240

[56] References Cited

U.S. PATENT DOCUMENTS

| | | | |
|---|---|---|---|
| 2,339,958 | 1/1944 | Sparks | 525/240 X |
| 2,854,435 | 9/1958 | Briggs et al. | 525/240 X |
| 2,993,876 | 7/1961 | McGlamery | 525/240 X |
| 3,308,217 | 3/1967 | Lowy et al. | 264/117 |
| 3,786,018 | 1/1974 | Nadler . | |
| 3,821,332 | 6/1974 | Solop | 525/240 |
| 3,923,947 | 12/1975 | Cook | 264/141 |
| 3,993,718 | 11/1976 | Bontinck et al. | 264/211 X |
| 4,013,622 | 3/1977 | DeJuneas et al. | 264/211 X |
| 4,310,483 | 1/1982 | Dörfel et al. | 264/117 |
| 4,352,911 | 10/1982 | Spence | 525/240 X |
| 4,409,167 | 10/1983 | Kolouch et al. | 264/211 X |
| 4,425,268 | 2/1985 | Cooper | 524/110 |
| 4,500,681 | 2/1985 | Shulman | 525/240 X |
| 4,508,859 | 4/1985 | Muhle et al. | 523/346 |
| 4,542,188 | 9/1985 | Van Der Heijden | 525/240 |
| 4,588,650 | 5/1986 | Mientus et al. | 525/240 X |
| 4,607,797 | 8/1986 | Enikolopow et al. | 425/379.1 X |
| 4,657,982 | 4/1987 | Breck et al. | 525/240 |
| 4,761,450 | 8/1988 | Lakshmanan et al. | 525/240 X |
| 4,784,822 | 11/1988 | Kitchel et al. | 264/211 X |

FOREIGN PATENT DOCUMENTS

| | | | |
|---|---|---|---|
| 639987 | 4/1962 | Canada | 525/240 |
| 717438 | 9/1965 | Canada | 525/240 |
| 961998 | 1/1975 | Canada . | |
| 1288293 | 1/1969 | Fed. Rep. of Germany | 525/240 |
| 2110433 | 9/1971 | Fed. Rep. of Germany | 264/211 |
| 2538296 | 6/1984 | France | 264/117 |
| 58-224727 | 12/1983 | Japan . | |
| 994482 | 2/1983 | U.S.S.R. . | |
| 572695 | 10/1945 | United Kingdom . | |
| 975847 | 11/1964 | United Kingdom | 264/117 |
| 1040968 | 9/1966 | United Kingdom | 264/117 |

*Primary Examiner*—Jeffery Thurlow
*Assistant Examiner*—Leo B. Tentoni

[57] ABSTRACT

A process for making compacted particulate polyolefin compositions is described. The process includes the steps of:

(a) thoroughly mixing a molten blend of a polyolefin and a modifying agent;

(b) cooling the blend to a temperature below the melting temperature of the polyolefin, while masticating the blend; and (c) continuing to masticate the blend and subsequently extruding the blend below its melting temperature to produce strands or pellets in crumble form.

The modifying agent may be solid or liquid at S.T.P. and should be mobile at processing temperatures. Examples of modifying agents include polyalkylene glycols, polyisobutylene. A preferred polyolefin is polyethylene. It is preferable that the process take place in a twin-screw extruder.

2 Claims, 1 Drawing Sheet

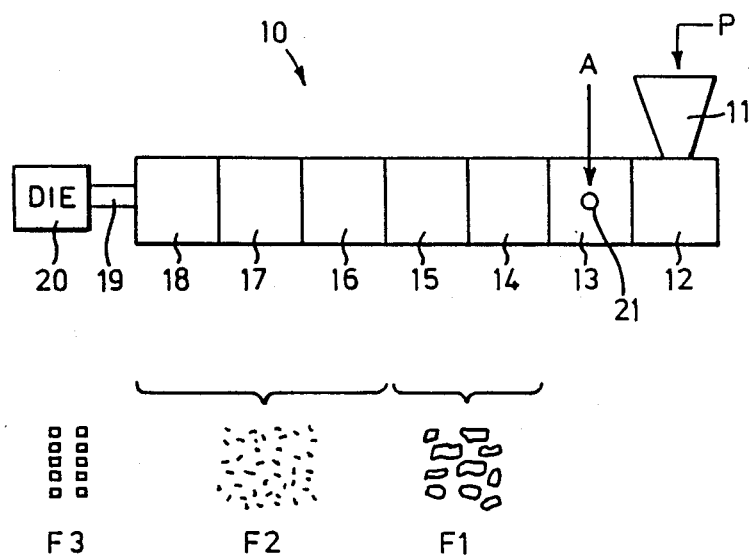

POLYOLEFIN CONCENTRATE

The present invention relates to polyolefin blends and in particular to a concentrate of a modifying agent in a polyolefin matrix.

Polyolefins, for example homopolymers of ethylene and copolymers of ethylene and higher alpha-olefins, are used in large quantities for a variety of end-uses. In general, polyolefins are manufactured in particulate form, and are sold for further processing into shaped articles, e.g. film, pipe, rods, sheet, moulded articles. It is common for polyolefins to be blended with compounds which modify the chemical and/or physical properties of the polyolefin. For example, polyalkylene glycols may be added to polyolefins to reduce the formation of gel streaks in film manufacture or to reduce the incidence of film breakdown, as disclosed, for example, in Canadian Pat. No. 961 998 to Hancock et al, which issued 1975 Jan. 28 and U.S. Pat. No. 4,013,622 to De Juneas et al, which issued 1977 Mar. 22. Also, for example, polybutenes or polyisobutylenes may be added to polyethylenes for the manufacture of self-sealing or cling-stretch films, as disclosed, for example, in U.S. Pat. No. 3,821,332 to E. Solop, which issued 1974 June 28, U.S. Pat. No. 4,588,650 to Mientus et al, which issued 1986 May 13 and U.S. Pat. No. 4,425,268 to B. A. Cooper, which issued 1984 Jan. 10.

The shaped polyolefin articles which contain modifying agents such as those described above, generally contain minor amounts of the modifying agents. Usually the concentration of modifying agent in the shaped article is less than 10 wt. % and most often is less than about 5 wt. %. The modifying agent may be added directly, in the shaped-article manufacturing process, or may be added in the form of a concentrate (sometimes known as a masterbatch) which may contain as high as 40-60 wt. % of the modifying agent in a polyolefin carrier. Addition in the form of a concentrate is particularly desirable for some shaped-article manufacturers in that it is not necessary to purchase special equipment to handle the modifying agent per se.

The present invention is particularly directed to the manufacture of polyolefin concentrates containing up to about 60 wt. % of a modifying agent. The maximum concentration of the modifying agent depends in a large part upon the properties of the modifying agent but may be determined through easy experimentation.

According to the disclosures in U.S. Pat. No. 4,607,797 which issued 1986 Aug. 26 to Enikolopow et al. it is known to pulverize polymers in an extruder, using a technique whereby the polymer is first melted, then cooled below its melting temperature. The cooled polymer is crushed and pulverized and then discharged from the extruder, thus forming a powdered polymer.

A method has now been found which is suitable for the manufacture of strands or pellets of polyolefin concentrate.

Accordingly the present invention provides a process for making particulate polyolefin compositions comprising:
(a) thoroughly mixing a molten blend of a polyolefin and at least one modifying agent;
(b) cooling said blend to a temperature below the melting temperature of the polyolefin, while masticating the blend;
(c) continuing to masticate the blend; and
(d) subsequently extruding said blend below its melting temperature to produce strands or pellets.

The extrusion step may be omitted if the method is a batch process, for example if carried out using a Banbury ® mixer. The masticated blend would then be in an incompacted irregularly shaped particulate form e.g. fluff, fibrous form.

The term "crumble" as used herein indicates that the particulate is in a form which is friable or may be subdivided relatively easily. It may be possible for example, in some instances, to subdivide the crumble merely by using a thumbnail to split the crumble, or to crush the crumble with the flat end of a pencil. The crumble is never as hard to subdivide as polyolefin pellets which have been formed from conventional melt extrusion processes. After the crumble has been subdivided, the particles are soft.

The term "polyolefin" as used herein encompasses normally solid polymers of at least one hydrocarbon alpha-olefin having 2-10 carbon atoms. Such polymers may be homopolymers or copolymers. Examples of such polyolefins include homopolymers of ethylene, propylene and 4-methyl pentene-1, copolymers of ethylene and/or propylene with at least one of butene-1, hexene-1 4-methyl pentene-1 and octene-1, and copolymers of ethylene and vinyl acetate.

In a preferred embodiment the polyolefin is a homopolymer of ethylene, a copolymer of ethylene and at least one $C_4$ to $C_{10}$ alpha-olefin or a copolymer of ethylene and vinyl acetate.

In yet another embodiment a process, for the manufacture of particulate polyolefin concentrate in an extruder which is adapted for the manufacture of strands of polyolefin, said extruder having at least two segments, the segment at or adjacent to the place or places of introduction of the polyolefin and a modifying agent (Segment A) being adapted to heat a blend of a polyolefin and a modifying agent to a temperature above their melting temperatures and to mix said polyolefin and modifying agent thoroughly to form a blend, and the remaining segments being adapted to cool said blend and to maintain the temperature of said blend at temperatures below the melting temperature of the polyolefin and to masticate the blend, said extruder also having an extrusion head which is adapted to permit extrusion of strands of said blend through holes in a die in said head, said process comprising:
(a) feeding said polyolefin and said modifying agent to Segment A;
(b) in Segment A, heating said polyolefin and said modifying agent to a temperature above the melting temperatures of the polyolefin and modifying agent, and mixing the polyolefin and modifying agent to form a substantially homogeneous blend;
(c) in the remaining segments of the extruder, masticating the blend and cooling the blend to a temperature below the melting temperature of the polyolefin; and
(d) extruding the cooled blend through the extrusion head or die at a temperature, said temperature being above the temperature at which the polyolefin will plug said holes and below the temperature at which the polyolefin will melt.

In a preferred embodiment the remaining segments are cooled in order to cool the blend. In another embodiment, a cooling fluid is adapted to the blend in order to cool the blend. A preferred cooling fluid is water.

Modifying agents suitable in the present invention for blending with the polyolefin may be compatible or incompatible with the polyolefin but must be capable of being in liquid or molten form when the polyolefin is molten. The modifying agents may be solid or liquid under conditions of Standard Temperature and Pressure, viz. 20° C. and 101.325 kilopascals, but should be mobile at the highest processing temperature of the process of the present invention and should not degrade or "flash off" (evaporate) at processing temperatures and pressures. Examples of such modifying agents include polyisobutylenes, silicones, polyalkylene glycols, ethoxylated tertiary salts of carboxylic acids. For example, polyethylene glycols having molecular weights of 900 to 6000, polyisobutylenes having molecular weights between 300 and 15000, and lithium stearate are suitable for use as modifying agents in the present invention to prepare a crumble of polyisobutylene in a polyolefin the concentration of polyisobutylene in the crumble can be from 20-60 wt %.

The various aspects of the invention are now described, with particular emphasis on concentrates of polyisobutylene in a polyolefin base. Some aspects may be described, with reference to the drawing which shows, schematically, an extruder and an artist's conception of the physical forms of the polyolefin blend.

The preferred process of the present invention involves the blending of the polyolefin and modifying agent in an extruder. Such process is preferred because it is continuous and relatively inexpensive. The concentrate of the present invention may be made with other apparatus, e.g. a Banbury® mixer, a Brabender® mixer.

Although single screw extruders may be used in the present invention, twin screw extruders are preferred commercially because the intensity of mixing is greater, which means that the extruder barrel may be shorter. This is important not only from a capital cost standpoint but also the factory space required for siting the extruder. The screw configuration is important, too, in being able to keep the barrel length as short as possible. For example, mixing and dispersion of the modifying agent in the polyolefin may be aided by the use of mixing elements, e.g. kneading blocks or the like, on the screw in the segment of the extruder wherein the polyolefin is melted. As is known in the art, mixing elements which shear and mix the polyolefin intensely, e.g. kneading blocks, generate much heat in the mixing process. In the segments of the extruder where cooling takes place the use of such intense mixing elements is usually not desirable but may be used if sufficient cooling of the polyolefin can be accomplished in order to keep the polyolefin below its melting temperature.

With reference to the drawing, the twin screw extruder 10 comprises a feeder hopper 11 which is connected to barrel segment 12, barrel segments 13 to 18, a so-called "8-0" adapter 19, and an extrusion die 20. Barrel segment 13 has an injection port 21 therein. Although not shown in the drawing, barrels 13 and 14 have twin screws with kneading blocks thereon. Barrels 15 to 18 have twin-screws with conveying elements and mixing rings thereon. The exterior of barrel segments 15 to 18 are water-cooled.

The polyolefin, P, is introduced into the extruder through hopper 11 by known means, e.g. using a so-called loss-in-weight feeder. The polyolefin may be in pellet or powder form. If the modifying agent is a solid at room temperature it may be added, as part of a "salt and pepper" blend with the polyolefin or through a separate feeder hopper (not shown). The modifying agent, A, may be injected in liquid form through injection port 21, which may be upstream of one more kneading blocks or between kneading blocks. The polyolefin and modifying agent are melted and mixed intensively in barrel segments 13 and 14 so that the modifying agent is thoroughly dispersed into the molten polyolefin. The temperatures of barrel segments 13 and 14 may be, for example, 10°-100° C. higher than the melting temperature of the polyolefin, and are typically about 2°-80° C. higher than the melting temperature of the polyolefin, while the temperatures of barrel segments 15 to 18 are substantially below the melting temperature of the polyolefin. Typical temperatures of the barrels are 20°-80° C. As the blend polyolefin and modifying agent is cooled below the melting temperature of the polyolefin the solidifying polyolefin is cut up, as indicated by F1 in the drawing. Further mastication caused by the twin screws, and optionally mixing rings, causes the solidified blend to be further subdivided to a mass with high surface area as indicated by F2 in the drawing. Conveying elements then compress the mass through the 8-0 adapter 19 and the die 20. The compacted mass, now in crumble or wax form, is extruded into strands through holes in the die. The strands may then be divided into pellets or the like, as indicated by F3 in the drawing, for ease of handling. For ease of extrusion it is desirable to maintain the temperature of the die somewhat closer to the melting temperature of the polyolefin than that of the last barrel segment, e.g. about 10°-30° C. below the melting temperature of the polyolefin. It is essential, however that the die temperature be below the melting temperature of the polyolefin, and higher than the temperature at which the polyolefin will plug the holes in the extrusion die. Even partial pluggage may cause the pressure to build up behind the die, thus leading to heating and melting of the polyolefin.

When a linear ethylene $C_4$ to $C_{10}$ alpha-olefin copolymer is used as the polyolefin, typical apparatus temperatures are 125°-225° C. for barrel segments 13 and 14, 20°-60° C. for the remaining barrels and 90°-110° C. for the die.

The process is now described in more detail with reference to polyisobutylene as the modifying agent. Polyisobutylene is used as a tackifying agent. At room temperature many useful polyisobutylenes are oily in nature. A problem experienced heretofore with melt-blending 70 wt. % polyethylene and 30 wt. % polyisobutylene in a conventional melt extrusion process is that newly extruded pellets have the polyisobutylene well-captured within the polyethylene matrix. However, within 24 h at about 20° C., the polyisobutylene migrates to the surface of the pellet, causing the pellets to adhere to one another. The pellets have the appearance of having corn syrup poured over them. In order to overcome this problem, such pellets have to be blended with pellets or powder of a polyolefin which does not contain polyisobutylene. The present method appears to overcome, to a large extent, the problem of migration of the polyisobutylene. In the present method the problem of migration is principally lessened by (a) producing a blend as homogeneous as possible, which may be accomplished by kneading blocks in the intensive mixing section and the like and increasing the length of the intensive mixing section, (b) ensuring that the blend is rapidly cooled between the intensive mixing section and the masticating section, and (c) ensuring that the blend is thoroughly cooled before extruding through the die. If, for any reason the resulting crumble or waxy solid is tacky then provided that the polyisobutylene content is not too high e.g. greater than about 60%, the tackiness may be removed by re-extruding the crumble, keeping the polyolefin below its melting temperature, or by dusting the crumble or waxy solid with powdered polyethylene. The dusting technique is not as effective as the "double extrusion" technique but tends to be less expensive.

In the embodiment where a cooling fluid is added, such cooling fluid is added downstream of the intensive mixing segment, e.g. in barrel segment 15. The cooling fluid is advantageously water but may be other fluids e.g. liquid nitrogen, alcohols, fluorocarbons. The cooling action of the cooling fluid may be accomplished by "flooding" the blend with sufficient cooling fluid to lower the temperature of the polyolefin to below its melting temperature. This may not be entirely satisfactory in some situations because some of the cooling fluid may remain entrapped in the crumble or waxy solid. In order to overcome this difficulty, the cooling fluid may then be vented from vent ports in the barrels of the extruder e.g. in barrel segments 16 and 17, in order to attain some evaporative cooling. The cooling fluid may be the sole means of cooling the blend but it is preferable that the barrel segments of the extruder also be cooled externally. Additional cooling by internal screw cooling may also be used.

The form of the extrudate depends in a large part upon the characteristics of the modifying agent and the concentration of the modifying agent in the concentrate. For example, at concentrations of less than about 30 wt. % polyisobutylene in polyethylene, the extruded mass is in crumble form, whereas at concentrations of more than about 30–35% polyisobutylene in polyethylene, the extruded mass is in waxy form.

The present invention also provides for strands or pellets made by the present process.

The present invention is exemplified further by the following:

EXAMPLE 1

100 parts by weight Sclair 1311E ® linear low density polyethylene and 40 parts by weight of a polyisobutylene blend were melted and mixed intensively in a Brabender Plasticorder ® twin rotor compounder. The polyisobutylene blend consisted of 14.7 parts by weight of Indopol H-300 ® and 29.3 parts by weight of Indopol H-1900 polyisobutylenes. After such mixing about 14 parts by weight water was added to the compounder, thus bringing the temperature of the blend to 100°–105° C. Most of the water flashed off as steam. Further mixing and kneading of the blend, which was in soft plastic form, permitted folding of the resin onto itself to form a crumbled mass. The crumble so formed remained free of tackiness even after 24 h.

This experiment showed that the twin rotor action of sigma-blade mixer of the Brabender Plasticorder compounder provided sufficiently intense mixing of the polyethylene and polyisobutylene and sufficient mastication of the cooled blend.

EXAMPLE 2

The polyethylene and polyisobutylene of Example 1 were mixed and melted in a Gelimat ® high speed 1 liter mixer. 250 ml water was added to the molten blend. This type of mixer gave insufficient mastication to the cooled blend and a solid blob of polymer was formed. It was very sticky after 24 h due to the migration of the polyisobutylene to the surface of the polymer mass. This does not fall within the scope of the present invention.

EXAMPLE 3

In this experiment a 90 mm Berstorff twin screw, six-segment extruder, equipped with a 100-hole die, was used. The die holes were 2.2 mm in diameter. In the first two barrel segments of the extruder, adjacent the polyolefin feed hopper, two kneading blocks were used to ensure melting of the polyethylene feed. Polyisobutylene was fed into the first barrel segment and water into the third barrel segment. No venting of water was done. The first two barrel segments were heated to 200° C. and the last four barrel segments cooled to 65° C. Sclair 2114 linear low density polyethylene, ground to 30 mesh, was fed to the extruder at 80 kg/h; the polyisobutylene (the blend of Example 1 was used) was fed to the extruder at 90° C. at a rate of 49 kg/h; and water was fed to the extruder at a rate of 6 kg/h. The die temperature was set at about 80° C. The resulting extruded pellets had smooth but lumpy surfaces. The pellets were hard and wax-like, and soft enough to break with fingernails. The pellets were analysed to contain about 40 wt. % polyisobutylene and 5 wt. % water. This indicated that venting of the water would have been desirable. The pellets also had some surface tackiness and the pellets became sticky after 24 h.

The pellets were re-extruded, without melting, in a 63.5 mm single screw extruder at 80° C. The pellets so formed were free of surface tackiness and were free flowing. These pellets also were soft enough to be pierced with a fingernail, and had a rough surface texture.

EXAMPLE 4

In this experiment, a 90 mm Berstorff twin screw six-segment extruder, equipped with a 100 hole die was used. The die holes were 3.18 mm in diameter. The barrel segment temperatures were 220°, 150°, 43°, 60°, 55°, 46° C. for barrel segments 1 through 6. Barrel segment 6 was closest to the extrusion die. The die temperature was kept at 90° C. Sclair 1311E linear low density polyethylene ground to 30 mesh, was fed to the extruder at 70 kg/h. Indopol H-1500 polyisobutylene was fed into the first barrel segment at 100° C. at a rate of 42.5 kg/h. The resulting extruded pellets were hard, waxy, and had a lumpy surface, but they were still soft enough to be divisible by piercing the pellet with fingernails. The pellets were slightly tacky, and the tackiness was reduced by mixing polyethylene powder to the pellets.

EXAMPLE 5

In this experiment, a 90 mm Berstorff twin screw six-segment extruder was used with no die or adapter attached to the last barrel. The extruder temperatures were 160, 113, 42, 30, 29, and 39° C. for barrel segments 1 through 6.

Sclair 1311E polyethylene powder (30 mesh) was fed into the extruder at 101 kg/h. Indopol H-1500 polyisobutene was fed into the first barrel segment at a rate of 60 kg/h. The discharged material was irregular in size and shape and had a "crumble"-like texture.

This crumble was later pelletized in a 30.5 cm California ® Pellet Mill using a 4.76 mm × 25.4 mm with R die. The material was pelletized at a rate of 1160 kg/h. The material was tack free even after six months storage at 20° C.

I claim:

1. Strands or pellets of polyisobutylene having a molecular weight from 300–15,000 in a polyolefin, in which the concentration of polyisobutylene in the strands or pellets is from 30–60 weight percent.

2. A crumble of polyisobutylene in a polyolefin in which the concentration of the polyisobutylene having a molecular weight of from 300–15,000 in the crumble is from 20–60 weight percent.

* * * * *